United States Patent
Bo et al.

(10) Patent No.: US 8,698,334 B2
(45) Date of Patent: Apr. 15, 2014

(54) WIND PARK, METHOD OF CORRECTING VOLTAGE IMBALANCES, AND WIND TURBINE

(75) Inventors: Yin Bo, Singapore (SG); Heng Deng, Singapore (SG); Ove Styhm, Århus N (DK); Kim B. Larsen, Aalborg Øst (DK)

(73) Assignee: Vestas Wind Systems A/S, Aarhus N. (DK)

( * ) Notice: Subject to any disclaimer, the term of this patent is extended or adjusted under 35 U.S.C. 154(b) by 177 days.

(21) Appl. No.: 12/761,864

(22) Filed: Apr. 16, 2010

(65) Prior Publication Data

US 2010/0264666 A1    Oct. 21, 2010

Related U.S. Application Data

(60) Provisional application No. 61/170,168, filed on Apr. 17, 2009.

(30) Foreign Application Priority Data

Apr. 17, 2009  (DK) .................................. 2009 00501

(51) Int. Cl.
   *F03D 9/00*    (2006.01)
   *H02P 9/04*    (2006.01)

(52) U.S. Cl.
   USPC .............................................. 290/44; 322/37

(58) Field of Classification Search
   CPC ............................ F03D 7/0272; F03D 11/0083
   USPC ................ 290/44, 55, 40 B, 52, 53, 54, 7, 8; 323/207; 307/67, 84, 153; 416/132 B; 415/1; 322/37, 99
   See application file for complete search history.

(56) References Cited

U.S. PATENT DOCUMENTS

| | | | | |
|---|---|---|---|---|
| 2,525,489 A | * | 10/1950 | Jolly | 307/20 |
| 2,915,694 A | | 12/1959 | Bogert et al. | |
| 3,153,132 A | * | 10/1964 | Greene | 219/667 |
| 3,448,286 A | * | 6/1969 | Stackegard | 307/82 |
| 3,530,362 A | * | 9/1970 | Kegeles et al. | 363/68 |

(Continued)

FOREIGN PATENT DOCUMENTS

| | | |
|---|---|---|
| CN | 1588747 A | 3/2005 |
| GB | 2 410 386 A | 7/2005 |

(Continued)

OTHER PUBLICATIONS

Danish Search Report for Danish Patent Application No. PA 2009 00501, completed Sep. 17, 2009.

(Continued)

*Primary Examiner* — Julio Gonzalez R
(74) *Attorney, Agent, or Firm* — Patterson & Sheridan, LLP

(57) ABSTRACT

A wind park, a method of correcting voltage imbalances, and a wind turbine are provided. The wind park includes at least one wind turbine; a transformer coupled between the at least one wind turbine and a power grid. The transformer includes a primary winding arrangement coupled to the power grid, and a secondary winding arrangement coupled to the at least one wind turbine. The power grid includes at least three power lines, each power line conducting a respective phase of a multi-phase current. Each power line of the power grid is coupled to the primary winding arrangement via an individual tap changer. Influences of the detected voltage imbalances on the wind turbines can be compensated.

19 Claims, 11 Drawing Sheets

(56) References Cited

U.S. PATENT DOCUMENTS

| | | | | |
|---|---|---|---|---|
| 3,622,861 | A * | 11/1971 | Boksjo | 363/37 |
| 6,108,226 | A * | 8/2000 | Ghosh et al. | 363/142 |
| 6,906,476 | B1 * | 6/2005 | Beatenbough et al. | 315/276 |
| 7,239,036 | B2 * | 7/2007 | D'Atre et al. | 290/44 |
| 7,256,508 | B2 * | 8/2007 | Altemark et al. | 290/44 |
| 7,629,705 | B2 * | 12/2009 | Barker et al. | 290/55 |
| 2004/0100102 | A1 * | 5/2004 | Wobben | 290/55 |
| 2005/0042098 | A1 * | 2/2005 | Wobben | 416/132 B |
| 2007/0024059 | A1 * | 2/2007 | D'Atre et al. | 290/44 |
| 2007/0029802 | A1 * | 2/2007 | Moehlenkamp | 290/44 |
| 2008/0093853 | A1 * | 4/2008 | Barker et al. | 290/44 |
| 2008/0106099 | A1 | 5/2008 | Ichinose et al. | |
| 2009/0079193 | A1 * | 3/2009 | Nielsen et al. | 290/44 |
| 2009/0096211 | A1 * | 4/2009 | Stiesdal | 290/44 |
| 2009/0107256 | A1 * | 4/2009 | Jensen | 73/862 |
| 2010/0109447 | A1 * | 5/2010 | Achilles et al. | 307/153 |

FOREIGN PATENT DOCUMENTS

| | | |
|---|---|---|
| JP | 11-098690 A | 4/1999 |
| JP | 2004-088929 | 3/2004 |
| JP | 2004088929 | 3/2004 |
| JP | 2006-014445 | 1/2006 |
| SU | 617797 A1 | 7/1978 |
| WO | WO 2008/125163 A1 | 10/2008 |

OTHER PUBLICATIONS

European Patent Office Search Report and Search Opinion dated Apr. 25, 2012 for EP Application No. 10160003.9.

* cited by examiner

US 8,698,334 B2

WIND PARK, METHOD OF CORRECTING VOLTAGE IMBALANCES, AND WIND TURBINE

CROSS-REFERENCE TO RELATED APPLICATIONS

This application claims priority to Danish patent application no. PA 2009 00501 filed on 17 Apr. 2009 and U.S. provisional application No. 61/170,168 filed on 17 Apr. 2009, the content of each is incorporated herein by reference in its entirety for all purposes.

TECHNICAL FIELD

The present invention relates generally to a wind park and a method of correcting voltage imbalances. Further, the present invention relates to a wind turbine.

BACKGROUND

Wind parks usually comprise a plurality of wind turbines which are coupled via a main transformer to a power grid. Voltage imbalances may occur on the power grid. These voltage imbalances may be coupled into the wind park via the main transformer.

An unbalanced supply voltage from the power grid will typically give rise to a dc (direct current) link voltage variation at twice the line frequency in a grid-connected converter of the wind turbine. This dc voltage variation may result in an asymmetrical current with high total harmonics distortion (THD) if no voltage imbalance correction is implemented. Grid code requirements may not be fulfilled if an asymmetrical current with high THD is injected to the grid. Therefore, the grid code requirements may not be fulfilled due to the presence of voltage imbalances.

Further, the wind turbines may operate in an optimum efficiency in the presence of a balanced voltage. When the voltage is unbalanced, the efficiency of the wind turbines may reduce, which may result in a loss of power production of the wind turbines.

Hence, one objective of the present invention is to avoid the above-mentioned problems.

SUMMARY

According to an embodiment, a wind park is provided, including: at least one wind turbine; a transformer coupled between the at least one wind turbine and a power grid, wherein the transformer includes a primary winding arrangement coupled to the power grid, and a secondary winding arrangement coupled to the at least one wind turbine. The power grid includes at least three power lines, each power line conducting a respective phase of a multi-phase current, wherein each power line of the power grid is coupled to the primary winding arrangement via an individual tap changer.

According to an embodiment, the primary winding arrangement includes at least three windings.

According to an embodiment, the power grid has three power lines.

According to an embodiment, the primary winding arrangement has three windings.

According to an embodiment, each winding of the primary winding arrangement is coupled to a respective power line of the power grid via an individual tap changer.

According to an embodiment, each tap changer includes a plurality of contact points or a continuous contact line being connected to the primary winding arrangement. The primary winding arrangement can be connectable to the power lines via the contact points or the contact line.

According to an embodiment, each tap changer further includes a sliding contact for selectively contacting one of the plurality of contact points or for sliding along the contact line.

According to an embodiment, each tap changer further includes a switch assigned to each contact point. Each switch can connect one contact point to the power lines.

According to an embodiment, the tap changer is one or more of a group consisting of a mechanical tap changer, an electrical tap changer, and an electrical assisted tap changer.

According to an embodiment, the windings of the primary winding arrangement are connected in a wye configuration or a delta configuration.

According to an, embodiment, the primary winding arrangement is part of a high voltage side of the transformer.

According to an embodiment, the secondary winding arrangement includes a plurality of windings.

According to an embodiment, the primary winding arrangement and the secondary winding arrangement have the same number of windings.

According to an embodiment, the windings of the secondary winding arrangement are connected in a wye configuration or a delta configuration.

According to an embodiment, the secondary winding arrangement is part of a low voltage side of the transformer.

According to an embodiment, the wind park further includes a detection unit coupled to the power grid. The detection unit can be configured to detect voltage imbalances occurring on the power grid coupled to the primary winding arrangement.

According to an embodiment, the wind park further includes a processing unit coupled to the detection unit. The processing unit can be configured to calculate respective tap changer adjustments for each tap changer needed in order to compensate influences of the detected voltage imbalances on the wind turbines.

According to an embodiment, the wind park further includes a tap changing controlling unit coupled to the processing unit. The tap changing controlling unit can be configured to control a tap changer adjustment process based on the calculated tap changer adjustments.

According to an embodiment, the transformer serves as a centralized transformer for a plurality of wind turbines.

According to an embodiment, the transformer is implemented within the at least one wind turbine.

According to an embodiment, there is provided a method of correcting voltage imbalances occurring on a power grid being coupled to a wind park via a transformer, the transformer having one or more tap changers. The method includes detecting voltage imbalances occurring on the power grid; calculating respective tap changer adjustments for the at least one tap changer needed in order to compensate influences of the detected voltage imbalances on the wind turbines; and adjusting the at least one tap changer based on the respective calculated tap changer adjustments.

According to an embodiment, a first set of tap changers may be adjusted based on one calculated tap changer adjustment and a second set of tap changers may be adjusted based on a further calculated tap changer adjustment.

According to an embodiment, the detection of the voltage imbalances includes measuring phase voltages at a point between the transformer and the power grid; and determining if the phase voltages form a negative voltage sequence or a zero voltage sequence. The at least one tap changer may be adjusted if a negative voltage sequence or a zero voltage sequence is detected.

According to an embodiment, the adjusting of the at least one tap changer includes changing or adjusting electrical connections between the power grid and a plurality of contact points or a continuous contact line being connected to the primary winding arrangement of the transformer.

According to an embodiment, the changing or adjusting of electrical connections between the power grid and the contact points includes selectively contacting one of the plurality of contact points.

According to an embodiment, the changing or adjusting of electrical connections between the power grid and the contact line includes moving a sliding contact along the contact line.

According to an embodiment, the changing or adjusting of electrical connections between the power grid and the contact points or the contact line includes opening or closing a switch of each contact point.

According to an embodiment, there is provided a wind turbine including a transformer coupled between the at least one wind turbine and a power grid, wherein the transformer includes a primary winding arrangement coupled to the power grid, and a secondary winding arrangement coupled to the at least one wind turbine; wherein the power grid includes at least three power lines, each power line conducting a respective phase of a multi-phase current; and wherein each power line of the power grid is coupled to the primary winding arrangement via an individual tap changer.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Exemplary embodiments of a wind park, a method of correcting voltage imbalances, and a wind turbine in accordance with the present invention will be described in detail below with reference to the accompanying figures. It will be appreciated that the exemplary embodiments described below can be modified in various aspects without changing the essence of the invention.

Figure 1:
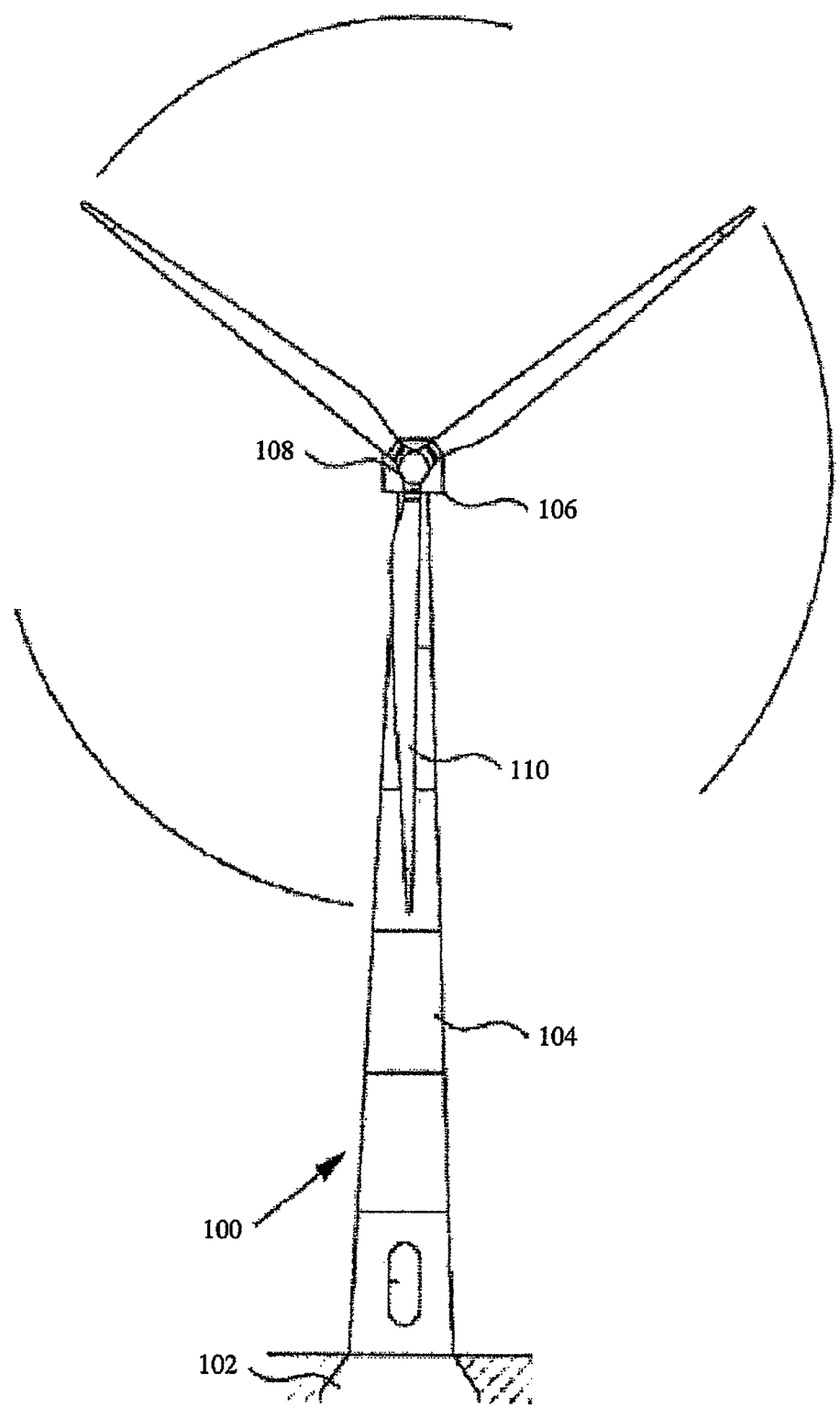
FIG. 1 illustrates a common setup of a conventional wind turbine.

FIG. 1 illustrates a common setup of a conventional wind turbine 100. The wind turbine 100 is mounted on a base 102. The wind turbine 100 includes a tower 104 having a number of towers sections, such as tower rings. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106.

Figure 2A:
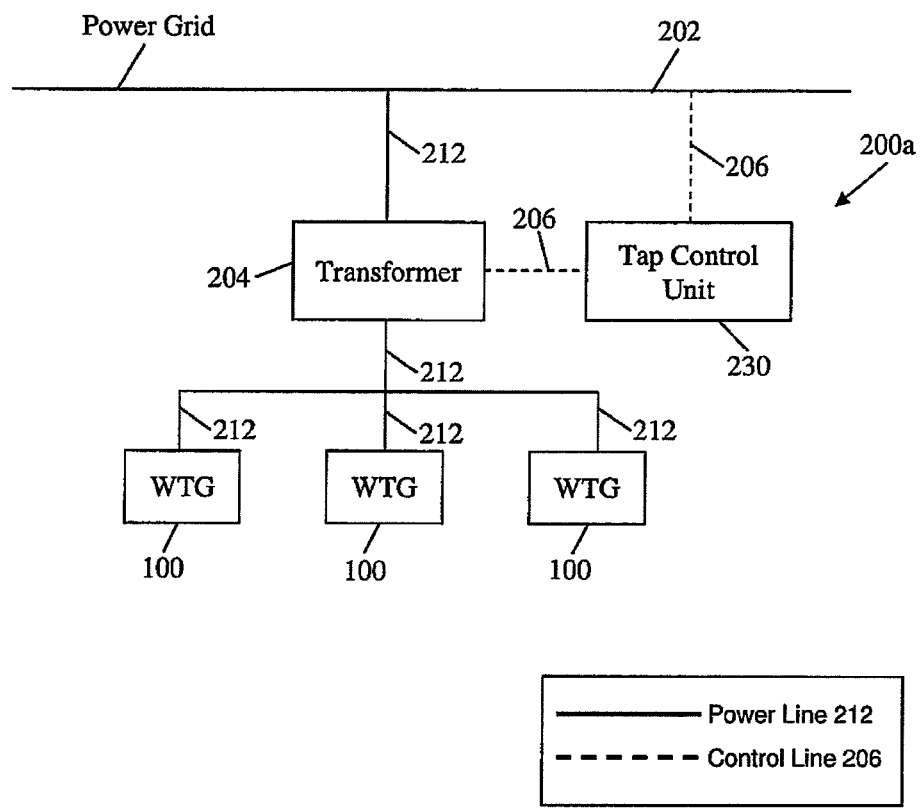
FIG. 2a shows a schematic diagram of a wind park according to an embodiment of the present invention.

FIGS. 2a to 2e respectively show a schematic diagram of a wind park 200a to 200e (also known as "wind farm" or a "wind power plant") according to an embodiment of the present invention. In FIG. 2a, the wind park 200 includes a plurality of wind turbines 100. However, it is to be understood that the term "wind park" in the sense of the present invention may also include the case of only one wind turbine. The wind turbines 100 are coupled to a power grid 202 via a transformer 204 via power lines 212. The transformer 204 is coupled between the wind turbines 100 and the power grid 202 via power lines 212. The wind park further 200a comprises a tap control unit 230 coupled to both the power grid 202 and the transformer 204 via control lines 206 (may also be referred as data lines). The tap control unit 230 serves for detecting voltage imbalances occurring on the power grid 202 and to control the transformer 204 in a way that undesired effects of the voltage imbalances on the wind park 200 can be prevented ("voltage compensation"). In the wind park 200a shown in FIG. 2a, the tap control unit 230 and the transformer 204 are separate devices. However, as shown in the wind park 200b of FIG. 2b, the tap control unit 230 may also be integrated into the transformer 204.

Figure 2B:
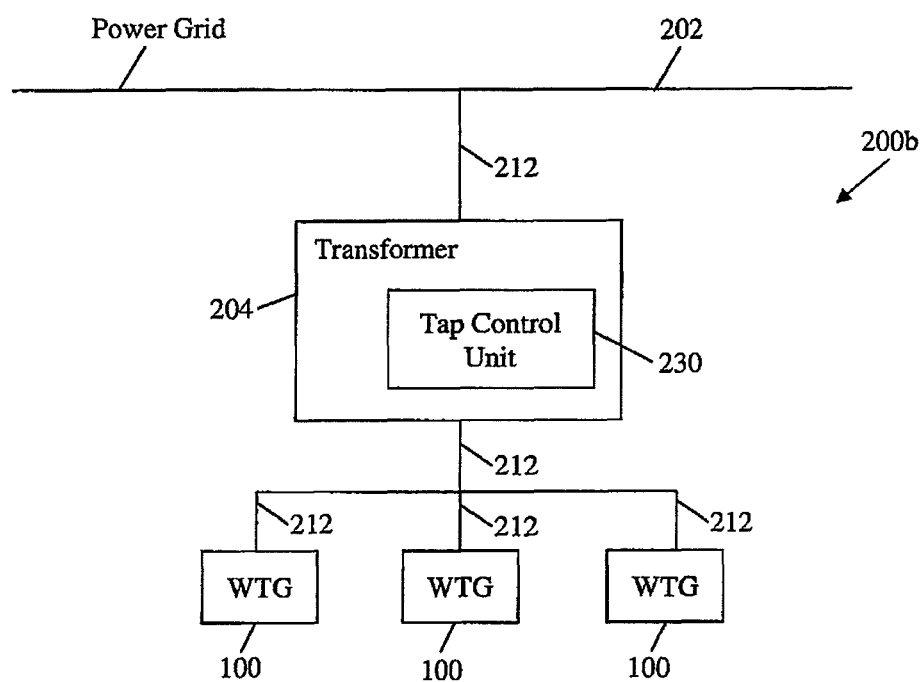
FIG. 2b shows a schematic diagram of a wind park according to an embodiment of the present invention.
Figure 2C:
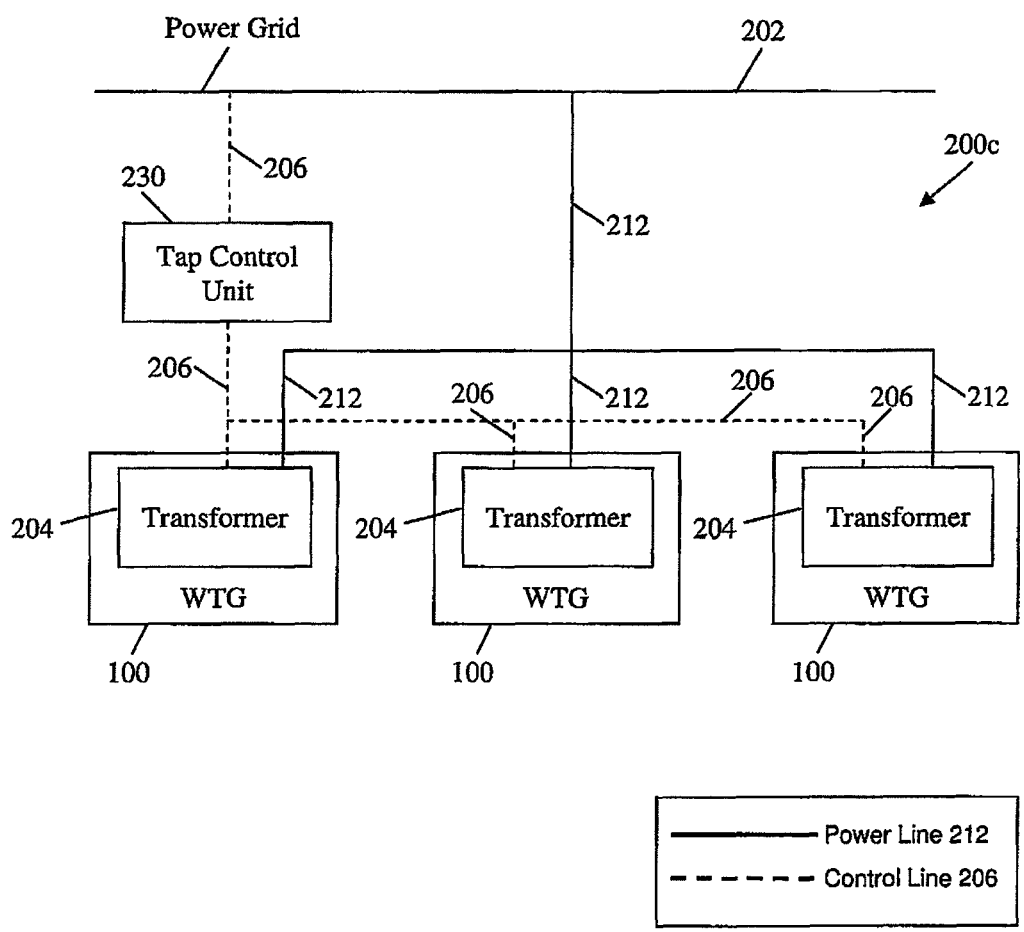
FIG. 2c shows a schematic diagram of a wind park according to an embodiment of the present invention.

In the wind parks 200a and 200b shown in FIGS. 2a and 2b, all wind turbines 100 are connected to the power grid via the same transformer 204. However, as shown in the wind park 200c of FIG. 2c, each wind turbine 100 may also have "its own" transformer 204 which may be integrated into the respective wind turbine 100 itself or be provided outside of the respective wind turbine 100. In the wind park 200c, each transformer 204 is connected to a centralized tap control unit 230 which is connected to the power grid 202 and which controls the operation of the transformers 204. The centralized tap control unit 230 is connected to the transformers 204 and the power grid 202 via control lines 206. As an alternative, each transformer 204 may be connected to an individual tap control unit 230 which may respectively be integrated into the corresponding wind turbine 100 or provided outside of the wind turbine 100. Each transformer 204 may be connected to the individual tap control unit 230 via control lines 206.

Figure 2D:
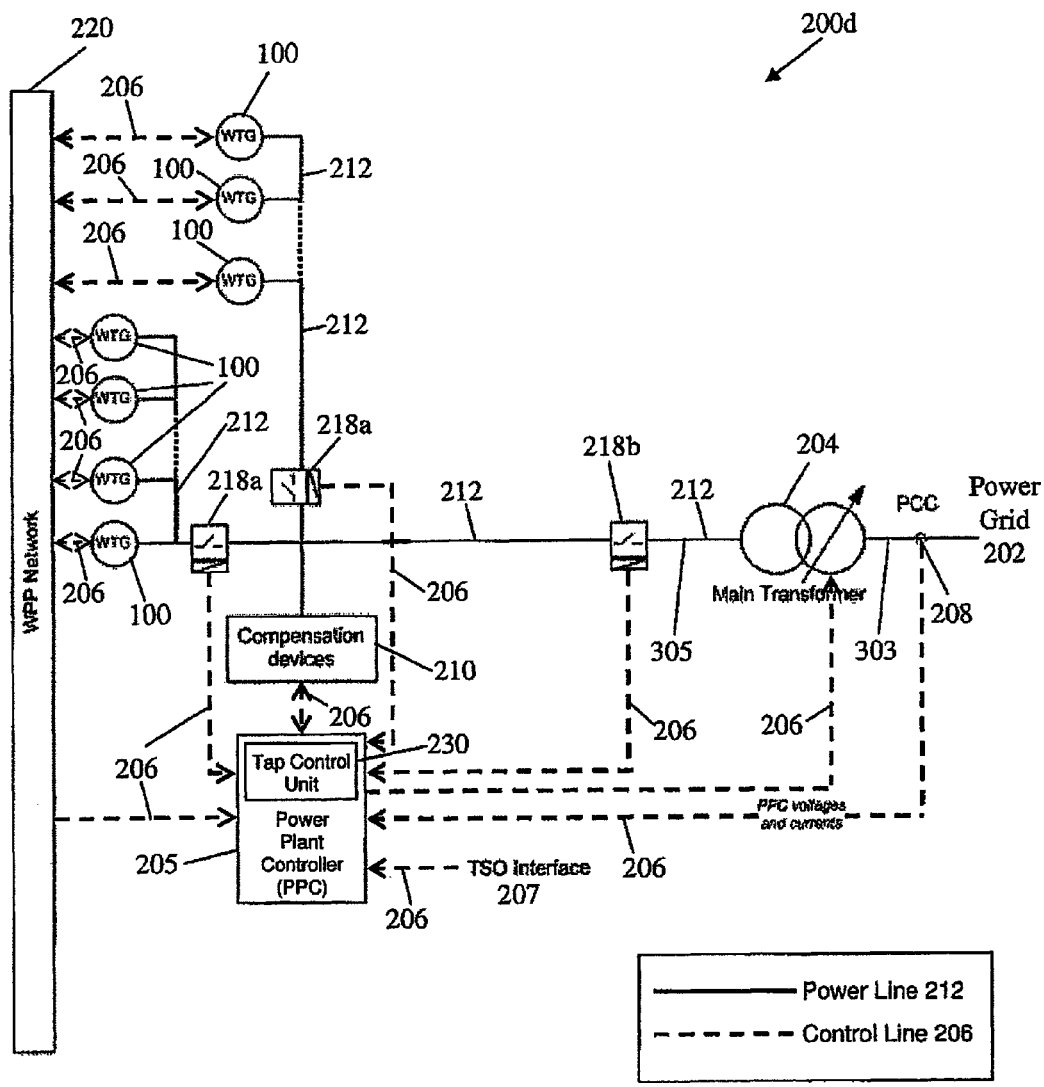
FIG. 2d shows a schematic diagram of a wind park according to an embodiment of the present invention.
Figure 2E:
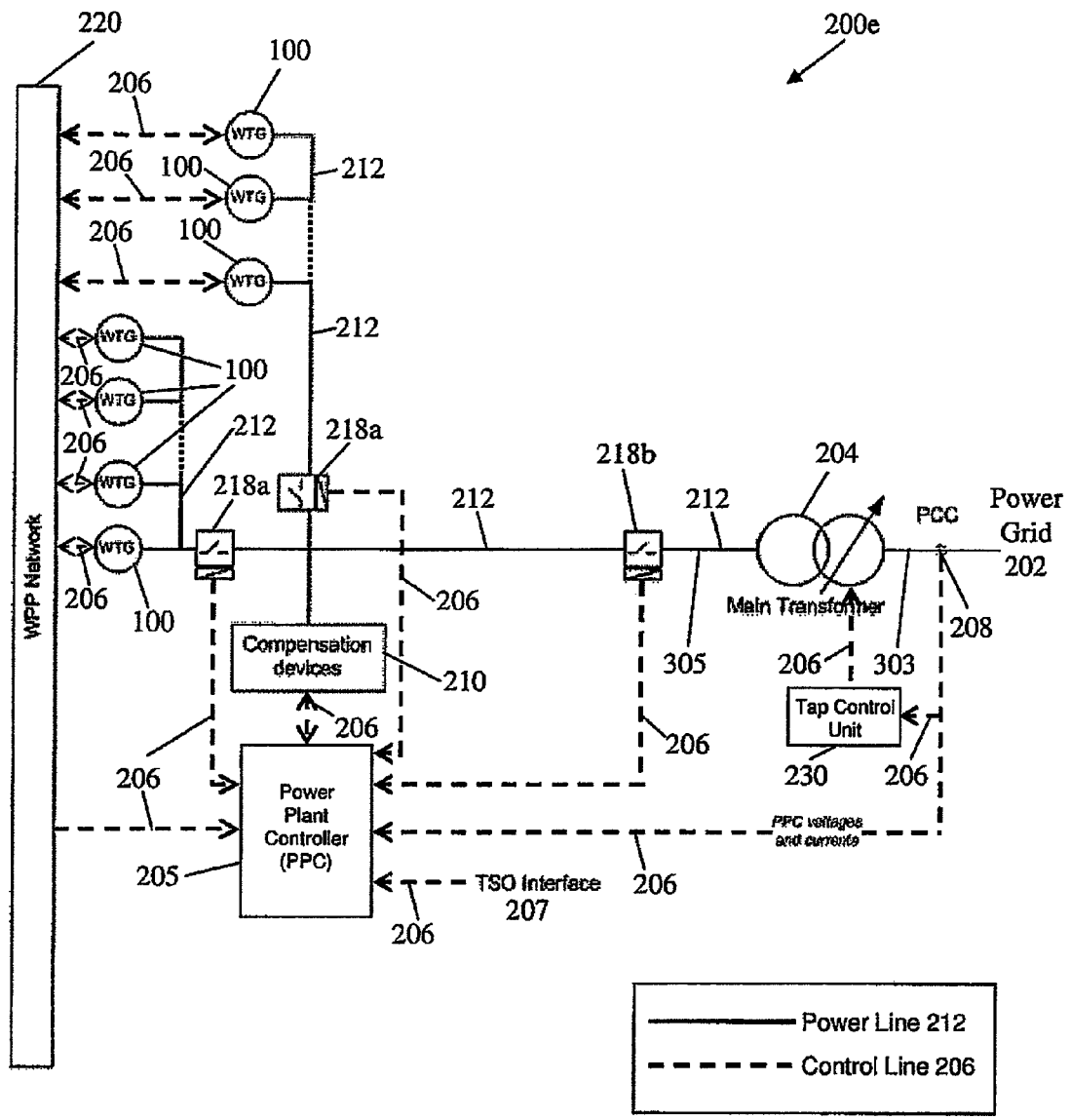
FIG. 2e shows a schematic diagram of a wind park according to an embodiment of the present invention.

FIGS. 2d and 2e show examples on how the wind park 200a shown in FIG. 2a may be realized in detail. FIGS. 2d and 2e shows wind parks 200d and 200e including a power plant controller 205 respectively. The power plant controller 205 generally fulfils a plurality of control functions. For example, the power plant controller 205 may collect different types of data which characterizes the current state of the wind turbines 100 in the wind parks 200d and 200e or components thereof, and in response thereto control the components in the wind park 200d, 200e (e.g. components in the wind turbines 100). All wind turbines 100 may communicate with the power plant controller 205 through a wind power plant network 220 coupled to the power plant controller 205 via a control line 206. For example, the wind turbines 100 may send wind turbine status data to the power plant controller 205. The power plant controller 205 may in response control the wind turbines 100 via the wind power plant network 220. The signals communicated between e.g. the wind turbines 100, the power plant controller 205, etc, can include but are not limited to power output, turbine status, power reference, and turbine command. For example, in a normal operating mode, the power plant controller 205 may send command data like power reference data to the wind turbines 100 to control operation of wind turbines.

As shown in the wind park 200d of FIG. 2d, a tap control unit 230 is integrated into the power plant controller 205. In this embodiment, the power plant controller 205 detects voltage imbalances occurring on the power grid 202 and controls the transformer 204 via control lines 206 in a way that undesired effects of the voltage imbalances on the wind park 200 can be prevented ("voltage compensation"). However, as shown in the wind park 200e of FIG. 2e, the tap control unit 230 and the power plant controller 205 may also be separate devices. In this embodiment, the tap control unit 230 detects voltage imbalances occurring on the power grid 202 and controls the transformer 204 via control lines 206 in a way that undesired effects of the voltage imbalances on the wind park 200 can be prevented ("voltage compensation").

The power plant controller 205 is coupled to the power grid 202 and to a transmission system operator (TSO) interface 207 via control lines 206. The power plant controller 205 may receive data or signals from the TSO interface 207. The TSO interface 207 may be used to transmit electrical power from power generation plants (in this case, the wind parks) to regional or local electricity distribution operators.

The power plant controller 205 is further connected to breakers or relays 218a, 218b and to compensation devices 210 via control lines 206. The breakers or relays 218a, 218b can be used to disconnect power lines 212 in cases of high currents: In the case of high currents, respective control signals are communicated to the power plant controller 205 via control lines 206 which in response thereto controls the breakers or relays 218a, 218b to disconnect power lines 212. The wind turbines 100 are connected to breakers or relays 218a via power lines 212. The breakers or relays 218a are connected to breaker or relay 218b via power lines 212. The breaker or relay 218b is connected to the transformer 204 via a power line 212.

The compensation devices 210 can include but are not limited to reactive power generation devices used to compensate reactive power of the wind park 200d of FIG. 2d and the wind park 200e of FIG. 2e. The compensation devices 210 can be a thyristor switched capacitor bank and a static Var compensator (SVC).

In one embodiment, the power plant controller 205 is configured to measure voltages and currents at a point 208 between the power grid 202 and the transformer 204 (point 208 may for example be the point of common coupling), in particular voltage imbalances and current imbalances occurring at point 208. However, the power plant controller 205 may also be configured to detect voltage imbalances at other points. It is assumed here that the voltages and currents on the power grid 202 usually have three phases, however it is to be understood that the present invention is not limited thereto. That is, the voltages and currents on the power grid 202 may also have more or less than three phases. Assuming that the voltages/currents on the power grid 202 are three phase voltages/currents, the voltage imbalances may for example be detected by determining if the three phase voltages occurring at the point of common coupling 208 form a negative voltage sequence or a zero voltage sequence. The voltage imbalances may also be detected in different ways, e.g. by comparing voltage amplitudes.

According to one embodiment, a balanced e.g. three phase voltage/current means that the three line voltages/currents are equal in RMS/peak magnitude and the respective phase angles of the voltages/currents are displaced from each other by 120° (i.e. 360°/3). Voltage imbalances occur when there is a difference between the e.g. three voltage magnitudes and/or there is a shift in the phase angle difference from 120°. If there are six phases, voltage imbalances occur when there is a difference between the six voltage magnitudes and/or there is a shift in the phase angle difference from 60° (i.e. 360°/6).

Figure 3A:
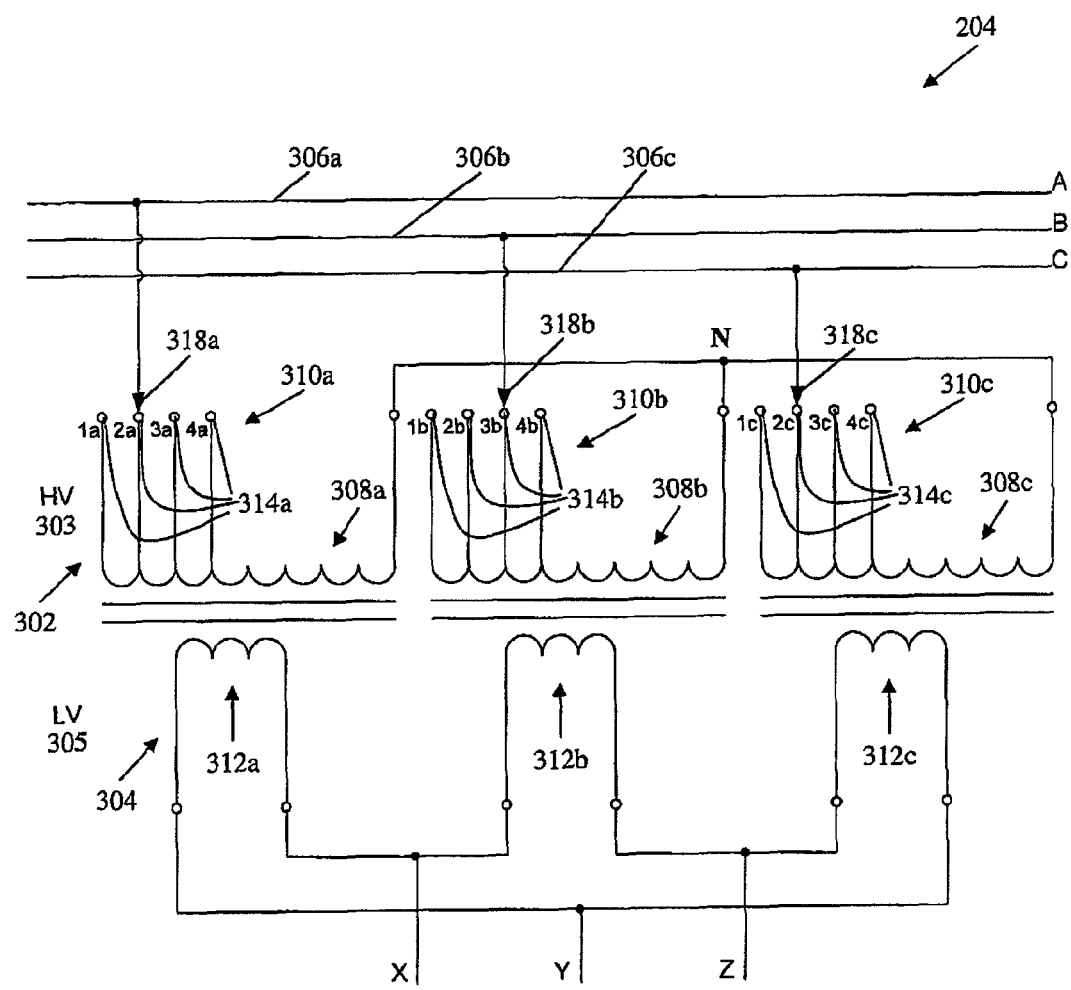
FIG. 3a shows a schematic diagram of a transformer having a first example of a tap changer according to an embodiment of the present invention.
Figure 3B:
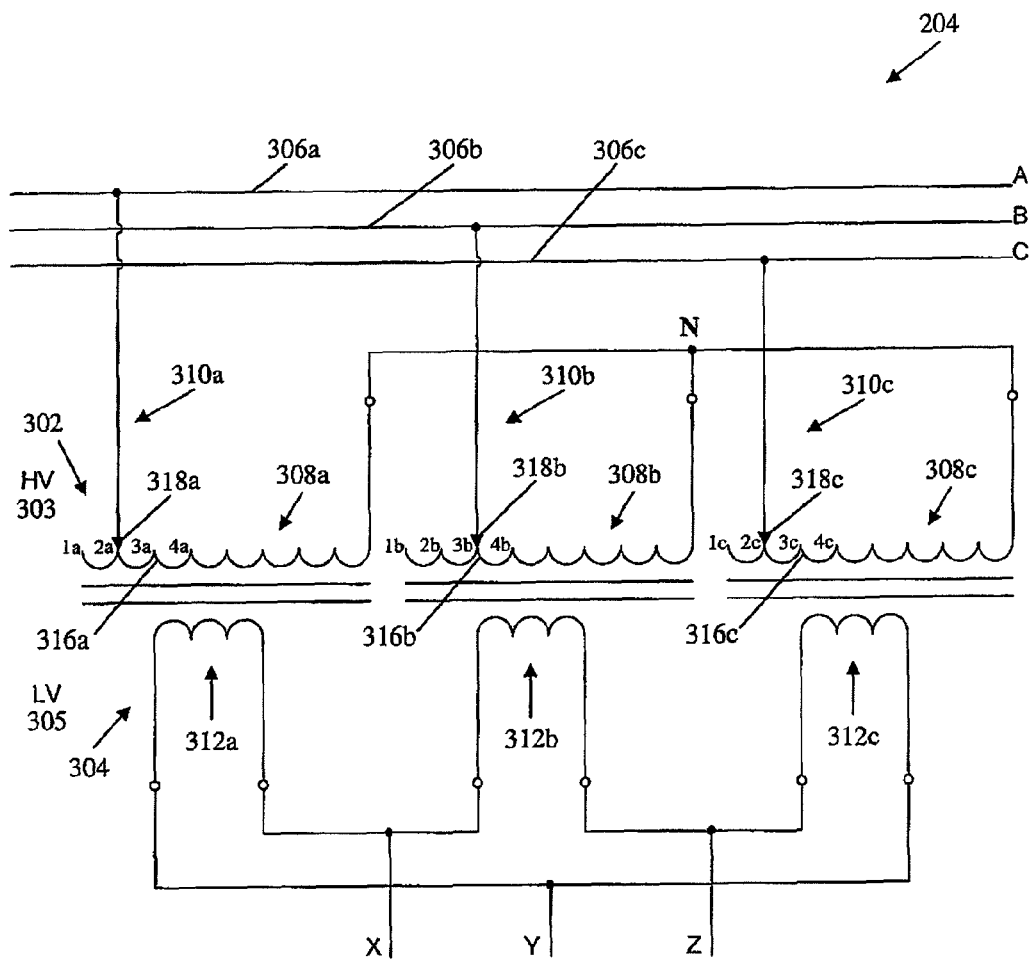
FIG. 3b shows a schematic diagram of the transformer having a second example of a tap changer according to an embodiment of the present invention.
Figure 3C:
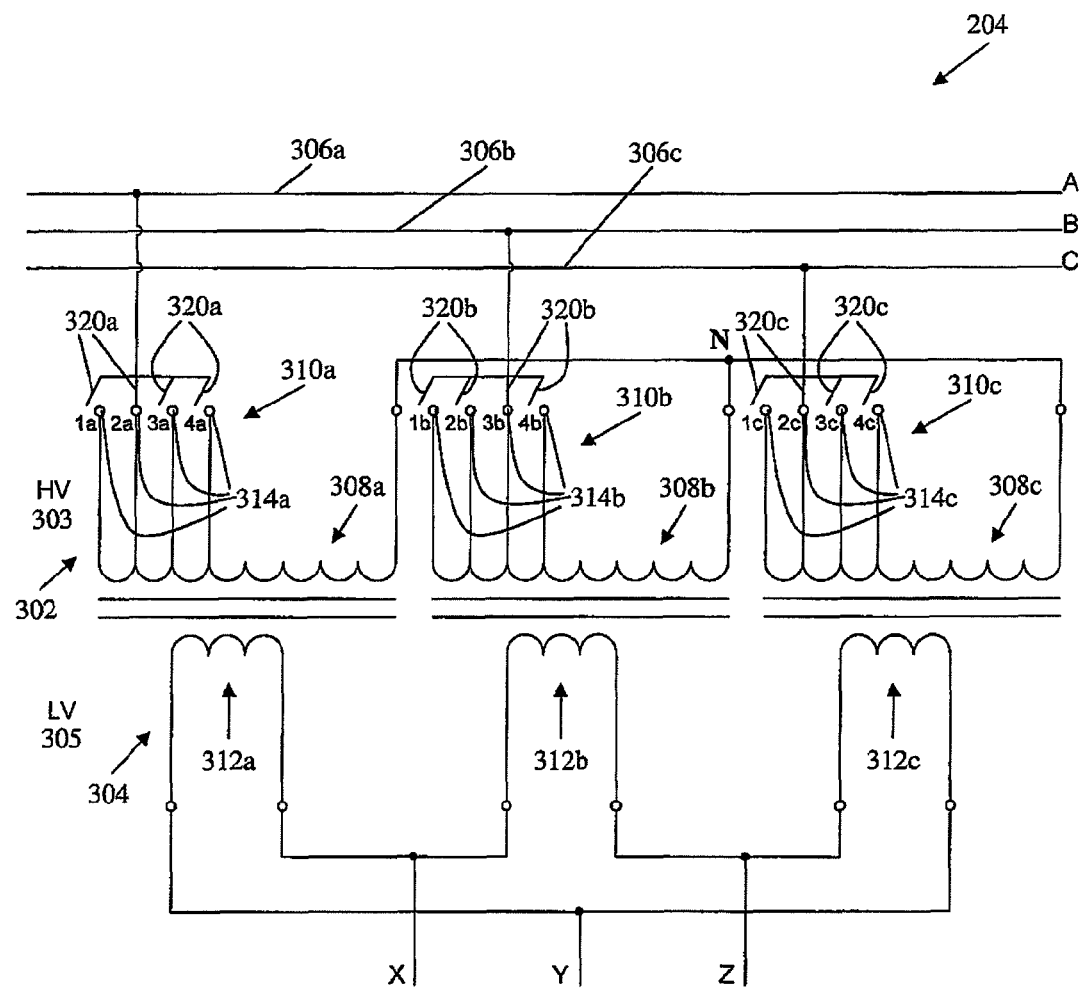
FIG. 3c shows a schematic diagram of the transformer having a third example of a tap changer according to an embodiment of the present invention.

FIGS. 3a to 3c show a schematic diagram of a possible embodiment of the transformer 204. The transformer 204 is a tap controlled transformer. The transformer 204 includes a primary winding arrangement 302 coupled to the power grid 202, and a secondary winding arrangement 304 coupled to the wind turbines 100.

In this embodiment, the power grid 202 has at least three power lines, e.g. three power lines 306a, 306b, 306c. Each power line 306a, 306b, 306c can conduct a respective phase of a multi-phase current. The primary winding arrangement 302 has at least three windings, e.g. three windings 308a, 308b, 308c. Each power line 306a, 306b, 306c of the power grid 202 is coupled to the primary winding arrangement 302 via an individual tap changer 310a, 310b, 310c.

In this embodiment, the windings 308a, 308b, 308c of the primary winding arrangement 302 are connected in a wye like configuration. Alternatively, the windings 308a, 308b, 308c of the primary winding arrangement 302 may be connected in a delta like configuration. The primary winding arrangement 302 is part of a high voltage side 303 of the transformer 204.

Here, the primary winding arrangement 302 has three windings 308a, 308b, 308c, and the secondary winding arrangement 304 also has three windings 312a, 312b, 312c. Depending on the type of power grid 202, the number of windings of the primary winding arrangement 302 and the secondary winding arrangement 304 may be changed accordingly. In the embodiments shown in FIGS. 3a to 3c, each of the windings 308a, 308b, 308c of the primary winding arrangement 302 is coupled to one of the phases of the multi-phase voltage. Alternatively, each phase of the multi-phase voltage may also be connected to two or more windings. That is, each of the windings 308a, 308b, 308c may respectively be split up into two or more windings. Similarly, each of the windings 312a, 312b, 312c of secondary winding arrangement 304 may respectively be split up into two or more windings.

The windings 312a, 312b, 312c of the secondary winding arrangement 304 are connected in a delta like configuration in one embodiment. Alternatively, the windings 312a, 312b, 312c of the secondary winding arrangement 304 may be connected in a wye like configuration. The secondary winding arrangement 304 is part of a low voltage side 305 of the transformer 204. X, Y, and Z represent respective conductors of the power line 212 connected to the main transformer 204, each conductor carrying a phase of a multi phase current.

Each winding 308a, 308b, 308c of the primary winding arrangement 302 is coupled to the respective power line 306a, 306b, 306c via an individual tap changer 310a, 310b, 310c. The tap changers 310a, 310b, 310c can be but are not limited to a mechanical tap changer, an electrical tap changer, and an electrical assisted tap changer. The tap changers 310a, 310b, 310c may be realized as on-load tap changers or as off-load tap changers. The tap changers 310a, 310b, 310c can be used to handle load effect and voltage regulation.

Each tap changer 310a, 310b, 310c may have a plurality of contact points 314a, 314b, 314c (see FIG. 3a) or a contact line 316a, 316b, 316c (see FIG. 3b) connected to the primary winding arrangement 302. The primary winding arrangement 302 is connectable to the power lines 306a, 306b, 306c via the contact points 314a, 314b, 314c (see FIG. 3a) or the contact lines 316a, 316b, 316c (see FIG. 3b). Each tap changer 310a, 310b, 310c may have a sliding contact 318a, 318b, 318c for selectively contacting one of the plurality of contact points 314a, 314b, 314c (see FIG. 3a) or for continuously sliding along the contact lines 316a, 316b, 316c (see FIG. 3b). In another embodiment, each tap changer 310a, 310b, 310c may have a switch 320a, 320b, 320c assigned to each contact point 314a, 314b, 314c (see FIG. 3c). Each switch 320a, 320b, 320c can connect one contact point 314a, 314b, 314c to the power lines 306a, 306b, 306c. The switches 320a, 320b, 320c can be selectively opened and closed.

The plurality of contact points 314a, 314b, 314c for the tap changers 310a, 310b, 310c (see FIGS. 3a and 3c) may be arranged such that each contact point 314a, 314b, 314c is spaced apart from an adjacent contact point 314a, 314b, 314c of the same winding 306a, 306b, 306c by a single turn (more generally: by the same amount of turns) of the respective windings 306a, 306b, 306c of the primary winding arrangement 302. Therefore, the voltage change across two adjacent contact points 314a, 314b, 314c of the same winding 306a, 306b, 306c can be the voltage across a single turn (more generally: the voltage across a particular amount of turns). However, alternatively, the spacing of the contact points 314a, 314b, 314c may also be an in-equidistant spacing.

By implementing an individual tap changer 310a, 310b, 310c in each winding 308a, 308b, 308c of the transformer 204, voltage imbalances in each phase of the multi-phase voltage can be compensated by adjusting the tap changers 310a, 310b, 310c of the respective windings 308a, 308b, 308c individually. In this way, an imbalanced voltage can be effectively adjusted to a balanced voltage. If, as indicated in the embodiment of FIG. 2d, only one common centralized transformer 204 is used for all wind turbines 100, there is no need for correcting voltage imbalances on each wind turbine 100. In this way, a cost effective solution can be achieved since only one transformer (the transformer 204) is required to be modified to include the tap changers 310a, 310b, 310c.

Figure 4:
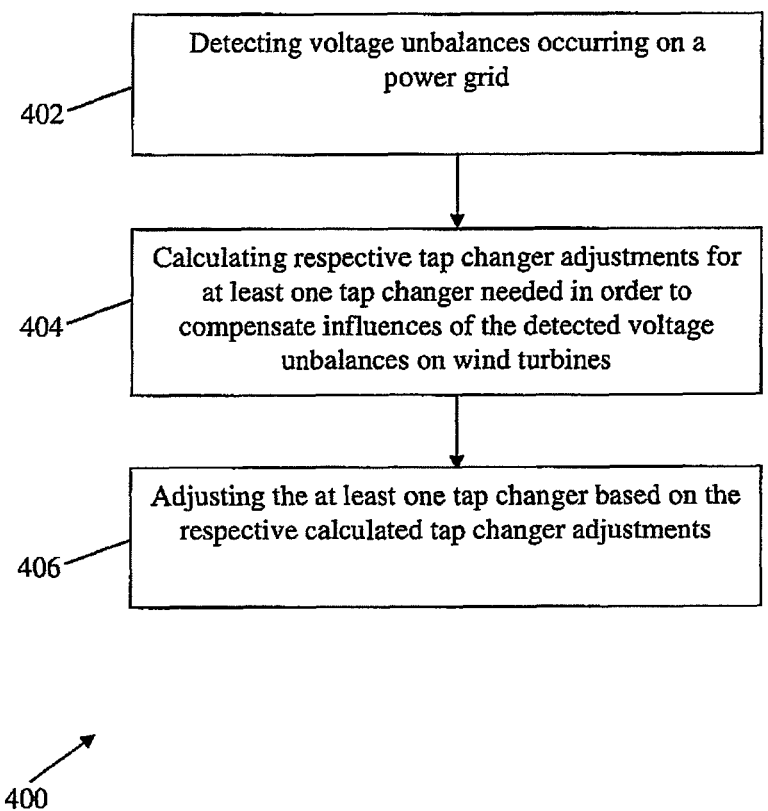
FIG. 4 shows a flowchart of a process of correcting voltage imbalances at a transformer of a wind park according to an embodiment of the present invention.

FIG. 4 shows a flowchart 400 of an embodiment of correcting voltage imbalances according to the present invention. At 402, voltage imbalances occurring on the power grid are detected. At 404, respective tap changer adjustments for the at least one tap changer needed in order to compensate influences of the detected voltage imbalances on the wind turbines are calculated. At 406, the at least one tap changer is adjusted based on the respective calculated tap changer adjustments.

Figure 5:
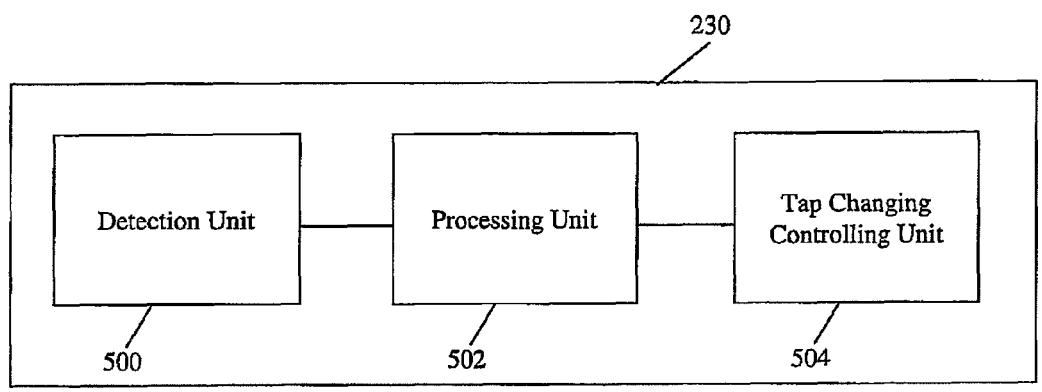
FIG. 5 shows a schematic drawing of a tap control unit used for correcting voltage imbalances at a transformer for a wind park according to an embodiment of the present invention.

FIG. 5 shows an example of a tap control unit 230 according to one embodiment of the present invention. The tap control unit 230 comprises a detection unit 500 coupled to the power grid 202, the detection unit 500 being configured to detect voltage imbalances occurring on the power grid 202 coupled to the primary winding arrangement 303. The tap control unit 230 further comprises a processing unit 502 coupled to the detection unit 500, the processing unit 502 being configured to calculate respective tap changer adjustments for each tap changer 310a, 310b, 310c needed in order to compensate the detected voltage imbalances. The tap control unit 230 further comprises a tap changing controlling unit 504 coupled to the processing unit 502, the tap changing controlling unit 504 being configured to control a tap changer adjustment process based on the calculated tap changer adjustments. Details of how voltages imbalances may be detected and compensated are described in the following.

In one embodiment, the detection unit 500 measures voltages and currents from the point of common coupling 208 between the power grid 202 and the transformer 204. The detection unit 500 also detects voltage imbalances occurring on the power grid 202. The voltages imbalances may for example be detected by determining if the three phase voltages from the point of common coupling 208 form a negative voltage sequence or a zero voltage sequence. The voltage imbalances may also be detected by comparing the voltage amplitudes.

The processing unit 502 calculates respective tap changer adjustments for each tap changer 310a, 310b, 310c needed in order to compensate the detected voltage imbalances. The tap changing controlling unit 504 controls a tap changer adjustment process based on the calculated tap changer adjustments.

The tap changer adjustments can be calculated by various methods. Two exemplary methods which may be used are scalar compensation method and vector compensation method.

Using the scalar compensation method, the respective voltage compensations for the tap changers 310a, 310b, 310c can be calculated using the following equations:

$$\begin{cases} \Delta V_a = V_a - V_{am} \\ \Delta V_b = V_b - V_{bm} \\ \Delta V_c = V_c - V_{cm} \end{cases}$$

wherein $V_{am}$, $V_{bm}$ and $V_{cm}$ are the respective transformer nominal voltages for each phase of a multi-phase voltage, and $V_a$, $V_b$ and $V_c$ are the respective measured transformer voltages for each phase of the multi-phase voltage. The respective transformer nominal voltages $V_{am}$, $V_{bm}$ and $V_{cm}$ are given for specific point of common coupling (PCC) 208. The respective measured transformer voltages $V_a$, $V_b$ and $V_c$ are measured at the power grid side. The transformer voltage $V_a$ is measured from the power line 306a to a neutral point N of the primary winding arrangement 302 (as shown in FIGS. 3a to 3c). The transformer voltage $V_b$ is measured from the power line 306b to a neutral point N of the primary winding arrangement 302 (as shown in FIGS. 3a to 3c). The transformer voltage $V_c$ is measured from the power line 306c to a neutral point N of the primary winding arrangement 302 (as shown in FIGS. 3a to 3c).

The tap changers 310a, 310b, 310c can be adjusted based on the calculated voltage compensations $\Delta V_a$, $\Delta V_b$ and $\Delta V_c$ respectively.

Using the vector compensation method, the measured transformer voltages $V_a$, $V_b$ and $V_c$ can be represented as the orthogonal sum of respective positive sequence components $V_{ap}$, $V_{bp}$, $V_{cp}$, respective negative sequence components $V_{an}$, $V_{bn}$, $V_{cn}$, and zero sequence component $V_n$, as shown in the following equations:

$$\begin{cases} V_a = V_{ap} + V_{an} + V_n \\ V_b = V_{bp} + V_{bn} + V_n \\ V_c = V_{cp} + V_{cn} + V_n \end{cases}$$

wherein $V_{ap}$, $V_{bp}$, $V_{cp}$ are the three-phase positive sequence components, $V_{an}$, $V_{bn}$, $V_{cn}$ are the three-phase negative sequence components, respectively, and $V_n$ is the zero sequence component. The positive sequence components and the negative sequence components can be obtained from a multi-phase voltage using some conventional algorithms.

The respective voltage compensations for the tap changers 310a, 310b, 310c can then be calculated using the scalar compensation method described above. The tap changers 310a, 310b, 310c can be adjusted based on the calculated voltage compensations $\Delta V_a$, $\Delta V_b$ and $\Delta V_c$ respectively.

To compensate the detected voltage imbalances, each tap changer 310a, 310b, 310c can be adjusted individually. For example, for the tap changers 310a, 310b, 310c shown in FIG. 3a, the electrical connections between the power grid 202 and the contact points 314a, 314b, 314c can be changed or adjusted by selectively contacting one of the plurality of contact points 314a, 314b, 314c. For the tap changers 310a, 310b, 310c shown in FIG. 3b, the electrical connections between the power grid 202 and the contact lines 316a, 316b, 316c can be changed or adjusted by moving the respective sliding contacts 318a, 318b, 318c along the respective contact lines 316a, 316b, 316c to a particular position. For the tap changers 310a, 310b, 310c shown in FIG. 3c, the electrical connections between the power grid 202 and the contact points 314a, 314b, 314c or the contact lines 316a, 316b, 316c can be changed or adjusted by selectively opening or closing the switches 320a, 320b, 320c respectively assigned to the contact points 314a, 314b, 314c or the contact lines 316a, 316b, 316c.

In the following, the tap changers 310a, 310b, 310c shown in FIG. 3a will be used as an illustration example for describing a tap changer adjustment process. It is assumed that, initially, the sliding contact 318a of the tap changer 310a for the phase A voltage (e.g. of power line 306a) was placed at the contact point 314a labelled '2a', the sliding contact 318b of the tap changer 310b for the phase B voltage (e.g. of power line 306b) was placed at the contact point 314b labelled '2b', and the sliding contact 318c of the tap changer 310c for the phase C voltage (e.g. of power line 306c) was placed at the contact point 314c labelled '2c'. Voltage imbalances were detected on the power grid 202 and the phase B voltage was found to be 1% higher than the phase A voltage and the phase C voltage. Assuming that there is 1% voltage deviation between two adjacent contact points 314a, 314b, 314c of the same winding 308a, 308b, 308c respectively, a balanced voltage can be obtained in the secondary winding arrangement 304 of the transformer 204 by moving the sliding contact 318b of the tap changer 310b from the contact point 314b labelled '2b' to the contact point 314b labelled '1b' at the primary winding arrangement 302 of the transformer 204. Thus, influences of the detected voltage imbalances on the wind turbines 100 can be compensated. In this way, the wind turbines 100 of the wind park 200 can be protected against voltage imbalances occurring on the power grid 202.

With the same scenario as stated above, for the tap changers 310a, 310b, 310c shown in FIG. 3b, a balanced voltage can be obtained in the secondary winding arrangement 304 by moving the sliding contact 318b of the tap changer 310b along the contact line 316b from a position labelled '2b' to a position labelled '3b'.

With the same scenario as stated above, for the tap changers 310a, 310b, 310c shown in FIG. 3c, a balanced voltage can be obtained in the secondary winding arrangement 304 by opening the switch 320b of the contact point 314b labelled '2b' of the tap changer 310b and closing the switch 320b of the contact point 314b labelled '3b' of the tap changer 310b.

In the above embodiments, phase tap control with individual tap control for each phase of a transformer has been described. Alternatively, phase tap control (three phase tap control or a tap control having less than two phases or more than three phases) without individual tap control for each phase of a transformer may be used for correcting the voltage imbalances. For example, the phase tap control without individual tap control may have the same configuration as the phase tap control with individual tap control as shown in FIGS. 3a to 3c. However, for a corresponding three phase tap control without individual tap control, the three tap changers 310a, 310b, 310c may be controlled simultaneously. That is, a common control signal representing a calculated tap changer adjustment may be sent from the tap control unit 230 to the three tap changers 310a, 310b, 310c at the same time. On the other hand, for the three phase tap control with individual tap control, the three tap changers 310a, 310b, 310c may be controlled individually. That is, a respective control signal representing a respective calculated tap changer adjustment may be sent from the tap control unit 230 to each of the three tap changers 310a, 310b, 310c either at the same time or at different timings. The respective control signal for each of the three tap changers 310a, 310b, 310c may represent a same calculated tap changer adjustment or a different calculated tap changer adjustment.

Compared to a three phase tap control without individual tap control, individual three phase tap control enables a better protection of wind turbines of a wind park: without individual tap control, the three phase voltages can only be adjusted simultaneously within a certain range, i.e. a fully balanced three phase voltage might not be achieved.

In one embodiment, some tap changers (e.g. at least two tap changers) of a phase tap control may be controlled simultaneously while the remaining tap changers (e.g. at least one tap changer) of the phase tap control may be controlled individually. For example, two tap changers (e.g. tap changers 310b, 310c) of a corresponding three phase tap control may be controlled simultaneously while one tap changer (e.g. tap changer 310a) may be controlled individually. That is, a common control signal representing a calculated tap changer adjustment may be sent from the tap control unit 230 to the tap changers 310b, 310c at the same time. The tap changers 310b, 310c may be adjusted simultaneously based on one calculated tap changer adjustment. A further control signal representing a further calculated tap changer adjustment may be sent from the tap control unit 230 to the tap changer 310a. The tap changer 310a may be adjusted based on the further calculated tap changer adjustment. The control signal for the tap changer 310a and the control signal for the tap changers 310b, 310c may represent a same calculated tap changer adjustment or a different calculated tap changer adjustment respectively. That is, the further calculated tap changer adjustment for the tap changer 310a and the calculated tap changer adjustment for the tap changers 310b, 310c may be the same in one embodiment. The further calculated tap changer adjustment for the tap changer 310a and the calculated tap changer adjustment for the tap changers 310b, 310c may be different in another embodiment. The control signal for the tap changer 310a and the control signal for the tap changers 310b, 310c may be sent from the tap control unit 230 at the same time or at different timings.

In another embodiment, a first set of tap changers can be controlled using a first control signal representing a calculated tap changer adjustment, a second set of tap changers can be controlled using a further control signal representing a further calculated tap changer adjustment, and the remaining one or more tap changers, if any, can be controlled individually using respective control signals representing respective calculated tap changer adjustments. The first set of tap changers may have one tap changer, which can be adjusted individually based on the calculated tap changer adjustment. In cases where the first set of tap changers have more than one tap changers, the tap changers can be adjusted simultaneously based on one calculated tap changer adjustment. Similarly, the second set of tap changers may have one tap changer, which can be adjusted individually based on the further calculated tap changer adjustment. In cases where the second set of tap changers have more than one tap changers, the tap changers can be adjusted simultaneously based on the further calculated tap changer adjustment. The tap changers can be grouped in various different ways (e.g. into different numbers of sets of tap changers) for adjustment by the respective calculated tap changer adjustments in other embodiments.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wind park, comprising:
    at least one wind turbine;
    a transformer coupled between the at least one wind turbine and a power grid, wherein the transformer comprises a primary winding arrangement coupled to the power grid, and a secondary winding arrangement coupled to the at least one wind turbine;
    wherein the power grid comprises at least three power lines, each power line conducting a respective phase of a multi-phase current,
    wherein each power line of the power grid is coupled to the primary winding arrangement via an individual tap changer; and
    a detection unit coupled to the power grid, the detection unit being configured to detect at least one of a voltage imbalance and a current imbalance between at least two of the power lines in the power grid coupled to the primary winding arrangement, wherein the at least one voltage imbalance and current imbalance comprises at least one of: (i) voltage or current magnitudes between at least two of the power lines that are unequal; and (ii) a phase imbalance where respective phase angles of the power lines are unequally spaced apart,
    wherein each tap changer is configured to correct the at least one of voltage imbalance and current imbalance by varying a number of turns of the primary winding arrangement that are selected.

2. The wind park of claim 1,
    wherein the primary winding arrangement comprises at least three windings.

3. The wind park of claim 2,
    wherein each winding of the primary winding arrangement is coupled to a respective power line of the power grid via an individual tap changer.

4. The wind park of claim 1,
    wherein each tap changer comprises a plurality of contact points or a continuous contact line being connected to the primary winding arrangement, wherein the primary winding arrangement is connectable to the power lines via the contact points or the contact line.

5. The wind park of claim 4,
    wherein each tap changer further comprises a sliding contact for selectively contacting one of the plurality of contact points or for sliding along the contact line.

6. The wind park of claim 4,
    wherein each tap changer further comprises a switch assigned to each contact point, each switch connecting one contact point to the power lines.

7. The wind park of claim 1,
    wherein the tap changer is one or more of a group consisting of a mechanical tap changer, an electrical tap changer, and an electrical assisted tap changer.

8. The wind park of claim 1, further comprising:
    a processing unit coupled to the detection unit, the processing unit being configured to calculate respective tap changer adjustments for each tap changer needed in order to compensate influences of the detected voltage or current imbalances on the wind turbines.

9. The wind park of claim 8, further comprising:
    a tap changing controlling unit coupled to the processing unit, the tap changing controlling unit being configured to control a tap changer adjustment process based on the calculated tap changer adjustments.

10. The wind park of claim 1,
    wherein the transformer serves as a centralized transformer for a plurality of wind turbines.

11. The wind park of claim 1,
    wherein the transformer is implemented within the at least one wind turbine.

12. A method of correcting imbalances occurring on a power grid being coupled to a wind park via a transformer, the power grid comprising at least three power lines and the transformer comprising a primary winding arrangement and at least one tap changer for coupling each of the at least three power lines to the primary winding arrangement, the method comprising:
    detecting at least one of a voltage imbalance and a current imbalance occurring between at least two of the power lines in the power grid, wherein the at least one voltage imbalance and current imbalance comprises at least one of: (i) voltage or current magnitudes between at least two of the power lines that are unequal; and (ii) a phase imbalance where respective phase angles of the power lines are unequally spaced apart;
    calculating respective tap changer adjustments for the at least one tap changer of each power line individually needed in order to compensate influences of the at least one detected voltage imbalance and current imbalance on the wind turbines; and
    adjusting the at least one tap changer of each power line individually, based on the respective calculated tap changer adjustments,
    wherein adjusting the at least one tap changer of each power line individually based on the respective calculated tap changer adjustments comprises varying a number of turns of the primary winding arrangement that are selected to correct the at least one of detected voltage imbalance and detected current imbalance.

13. The method of claim 12,
    wherein a first set of tap changers is adjusted based on one calculated tap changer adjustment and a second set of tap changers is adjusted based on a further calculated tap changer adjustment.

14. The method of claim 12,
    wherein the detection of the voltage imbalance comprises:
    measuring phase voltages at a point between the transformer and the power grid; and
    determining if the phase voltages form a negative voltage sequence or a zero voltage sequence;
    wherein the at least one tap changer is adjusted if a negative voltage sequence or a zero voltage sequence is detected.

15. The method of claim 12,
wherein the adjusting of the at least one tap changer comprises changing or adjusting electrical connections between the power grid and a plurality of contact points or a continuous contact line being connected to the primary winding arrangement of the transformer.

16. The method of claim 15,
wherein the changing or adjusting of electrical connections between the power grid and the contact points comprises selectively contacting one of the plurality of contact points.

17. The method of claim 15,
wherein the changing or adjusting of electrical connections between the power grid and the contact line comprises moving a sliding contact along the contact line.

18. The method of claim 15,
wherein the changing or adjusting of electrical connections between the power grid and the contact points or the contact line comprises opening or closing a switch of each contact point.

19. A wind turbine, comprising:
a transformer coupled between the wind turbine and a power grid, wherein the transformer comprises a primary winding arrangement coupled to the power grid, and a secondary winding arrangement coupled to the wind turbine;
wherein the power grid comprises at least three power lines, each power line conducting a respective phase of a multi-phase current;
wherein each power line of the power grid is coupled to the primary winding arrangement via an individual tap changer; and
a detection unit coupled to the power grid, the detection unit being configured to detect at least one of a voltage imbalance and a current imbalance between at least two of the power lines in the power grid, wherein the at least one voltage imbalance and current imbalance comprises at least one of: (i) voltage or current magnitudes between at least two of the power lines that are unequal; and (ii) a phase imbalance where respective phase angles of the power lines are unequally spaced apart,
wherein each tap changer is configured to correct the at least one voltage imbalance and current imbalance by varying a number of turns of the primary winding arrangement that are selected.

* * * * *